(12) United States Patent
Bugenhagen

(10) Patent No.: US 8,149,719 B2
(45) Date of Patent: Apr. 3, 2012

(54) SYSTEM AND METHOD FOR MARKING LIVE TEST PACKETS

(75) Inventor: Michael Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 127 days.

(21) Appl. No.: 12/323,667

(22) Filed: Nov. 26, 2008

(65) Prior Publication Data

US 2009/0201807 A1    Aug. 13, 2009

Related U.S. Application Data

(60) Provisional application No. 61/065,594, filed on Feb. 13, 2008.

(51) Int. Cl.
*H04L 12/24* (2006.01)
*G06F 11/30* (2006.01)

(52) U.S. Cl. .................... 370/241; 370/230; 370/252

(58) Field of Classification Search .................. 370/230, 370/232, 235, 248, 249, 241, 252; 709/224
See application file for complete search history.

(56) References Cited

U.S. PATENT DOCUMENTS

| | | | | | |
|---|---|---|---|---|---|
| 6,134,219 | A  * | 10/2000 | Sato | .............................. | 370/244 |
| 6,157,615 | A  * | 12/2000 | Akagawa et al. | ............. | 370/241 |
| 6,678,244 | B1 * | 1/2004 | Appanna et al. | ............. | 370/229 |
| 7,609,640 | B2 * | 10/2009 | Ahuja et al. | .................. | 370/236 |
| 2004/0095882 | A1* | 5/2004 | Hamzah et al. | ............... | 370/229 |
| 2004/0174815 | A1* | 9/2004 | Khisti et al. | .................. | 370/235 |
| 2005/0047340 | A1* | 3/2005 | Babiarz et al. | ................ | 370/231 |
| 2006/0056308 | A1* | 3/2006 | Gusat et al. | .................... | 370/252 |
| 2007/0041323 | A1* | 2/2007 | Kitahara et al. | ............... | 370/235 |
| 2007/0041326 | A1* | 2/2007 | Babiarz et al. | ................ | 370/237 |
| 2007/0153683 | A1* | 7/2007 | McAlpine | ..................... | 370/229 |
| 2008/0181123 | A1* | 7/2008 | Huang et al. | .................. | 370/252 |
| 2008/0225704 | A1* | 9/2008 | Sheinfeld et al. | ............. | 370/229 |
| 2009/0003210 | A1* | 1/2009 | Jakobsen et al. | ............. | 370/235 |

* cited by examiner

*Primary Examiner* — Kwang B Yao
*Assistant Examiner* — Candal Elpenord
(74) *Attorney, Agent, or Firm* — Patton Boggs LLP

(57) ABSTRACT

A system and method for preventing a packet of a test pattern from being communicated over a network. A congestion state of the network is determined. The packet is marked as being associated with a test pattern. The packet is determined to be associated with the test pattern in response to the marking. The communication of the packet is terminated in response to the determined congestion state.

22 Claims, 3 Drawing Sheets

SYSTEM AND METHOD FOR MARKING LIVE TEST PACKETS

CROSS-REFERENCE TO RELATED APPLICATIONS

This application claims priority to provisional application Ser. No. 61/065,594, filed on Feb. 13, 2008, entitled: System and Method for Marking of Live Testing Test Patterns, and which is incorporated herein by reference.

BACKGROUND

Currently, various methods of testing the throughput performance of a packet network, such as a request for comment (RFC) 2544 testing, utilize test patterns of test packets that are communicated across a network. For example, test packets marked with a lower quality of service may be utilized for the testing of the in-service network such that a higher quality of service traffic will remain prioritized over such test patterns of packets. In such a manner, additional traffic loads may be added to network traffic to determine throughput performance problems with a particular network segment, node, or device.

However, the use of test packets with quality of service marking matching live traffic to load the network may themselves cause network congestion and network failure that disrupts the use of services of customers utilizing the network undergoing testing. Currently, network elements have no discernable means of identifying what network traffic is associated with test patterns as compared to network traffic servicing real customer applications. As a result, the network customer has no ability to remove testing traffic causing a performance issue with the network.

SUMMARY

One embodiment includes a system and method for preventing a packet of a test pattern from being communicated over a network. A congestion state of the network may be determined. The packet may be marked as being associated with a test pattern. The packet may be determined to be associated with the test pattern in response to the marking. The communication of the packet may be terminated in response to the determined congestion state.

Another embodiment includes a system for removing test packets from a network. The system may include a network configured to facilitate communications between multiple nodes and multiple customers. The system may also include a communications management system in communication with the network. The communications management system may be operable to determine whether one or more portions of the network are congested. The system may also include a remote node in communication with the network. The remote node may be operable to determine whether a packet is associated with a test pattern and terminate the communication of the packet in response to the communications management system informing the remote node that the network is congested.

Yet another embodiment includes a network node. The network node may include a processor for executing a set of instructions and a memory for storing the set of instructions. The set of instructions being operable to determine a congestion state of the network, mark the packet as being associated with a test pattern, determine the packet is associated with the test pattern in response to the determined congestion state, and terminate the communication of the packet in response to the determined congestion state.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system and method that may be utilized to allow network elements to discern between test packets and ordinary network traffic servicing legitimate customer applications. Once such test patterns or test packets are so discernable, a network, system, or a particular network device, may refuse to communicate the packets associated with the test pattern during network congestion, high utilization, or potential network failure. The test packets may be terminated queued, stored, or otherwise permanently or temporarily removed from network traffic.

Figure 1:
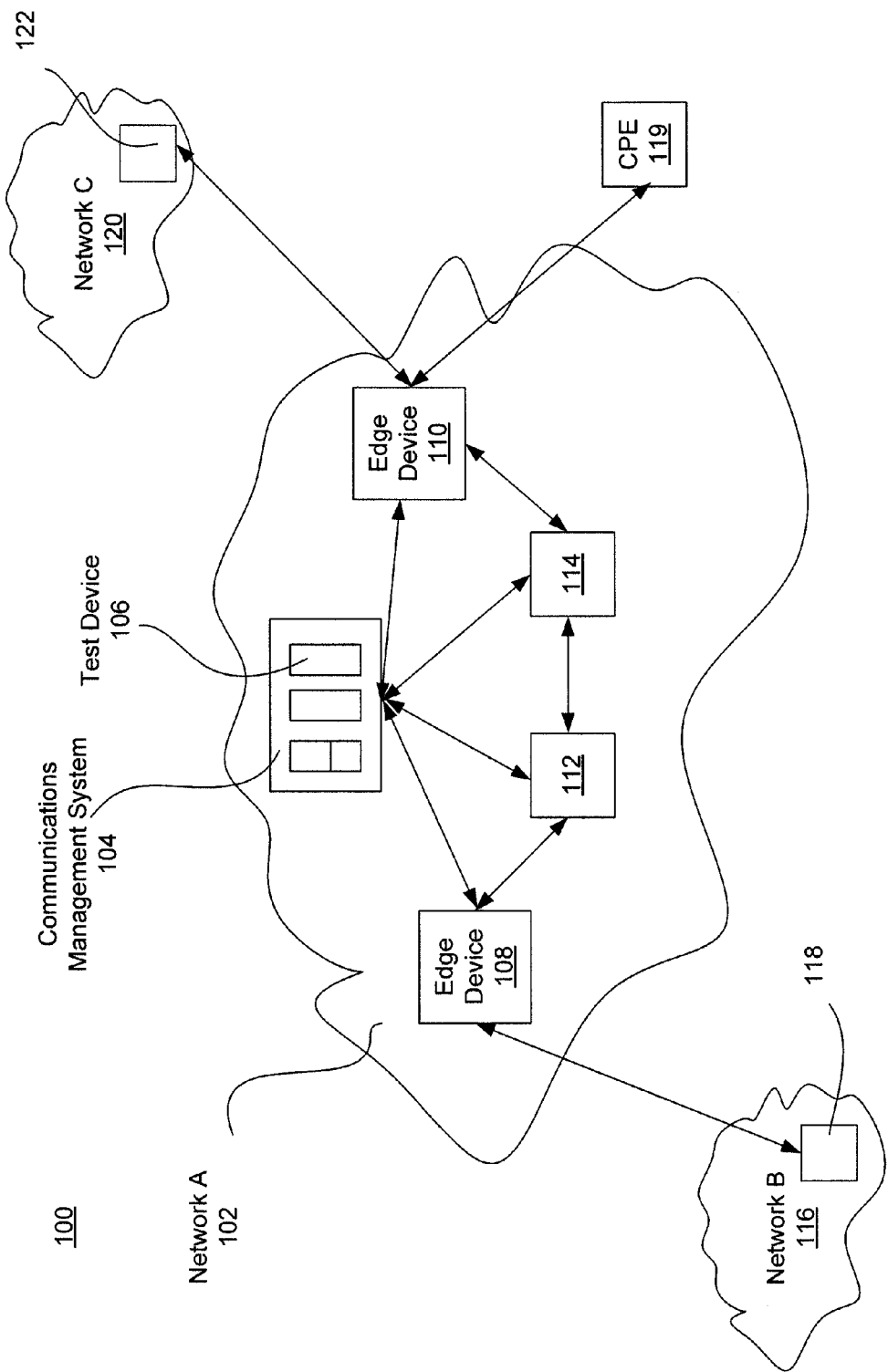
FIG. 1 is a pictorial representation of a communications environment in accordance with an illustrative embodiment.

FIG. 1 is a pictorial representation of a communications environment in accordance with the illustrative embodiment. FIG. 1 is one embodiment of a communications environment 100. The communications environment 100 is one or more networks, network users, communications systems, equipment, devices, and connections that enable communications. The communications environment 100 may be utilized for analog, data, packet, and voice communications utilizing any number of standards and protocols.

The communications environment 100 may include any number of devices, equipment, and systems. In one embodiment, the communications environment 100 may include network A 102, a communications management system 104, a test device 106, edge devices 108 and 110, nodes 112 and 114, network B 116, node 118, customer premise equipment (CPE) 119, network C 120, and node 122. Network A 102, network B 116 and network C 120 may represent one or more communications service providers. In another embodiment, each of the networks may be operated by a single communications service provider. In one embodiment, the networks and corresponding nodes and devices may be a portion of a Metro Ethernet network or ring. In another embodiment, the corresponding nodes and devices may be a portion of a Internet Protocol (IP) or IP multi-protocol label switching network.

The Ethernet ring may be any topology, structure, or design suitable for communication, such as hub-and-spoke, star, point-to-point, full mesh, partial mesh, or other Ethernet architectures. The Ethernet ring may be part of a communications network that may utilize a hierarchy, including a core, distribution, and access. For example, the core may be the backbone of the communications network for communicating signals, data, and information from one point to another.

The communications management system 104 is one, or more devices utilized to enable, initiate, route, and manage communications between one, or more telephonic or packet devices. In one embodiment, the communications management system 104 may be integrated or contained within the network nodes of the communications environment 100 as a control plane management protocol. In another embodiment, the communications management system 104 may be external to the network nodes. The communications management system 104 may include one, or more devices networked to manage the communications network A 102. For example, the communications management system 104 may include any number of servers, routers, switches, computing devices, or advanced intelligent network devices, including the edge devices 108 and 110 and nodes 112 and 114. The edge devices 108 are interfaces between network A 102 and other networks, connections, or users. The nodes 112 and 114, are examples of numerous intermediary devices that may be part of the communications network.

The communications management system 104 may also include the test device 106. The test device 106 may communicate test packets through the devices, nodes, and connections of the networks of the communications environment 100. For example, the test device 106 may send packets to the nodes 112, 114, 118 and 122 and edge devices 108 and 110 to test and evaluate network A 102, network B 116, and network C 120, as well as, specific parts, connections, devices, equipment, system, modules, and components. For example, the test packets may be sent and/or received from the nodes 112, 114, 118 and 122 to determine performance criteria and characteristics, such as throughput, latency, delay, jitter, packet loss, and other similar information. The test packets may be sent individually or as a pattern for analysis and evaluation. It is important to recognize that the testing system or communications management system 104 location is not restricted to an internal network or portions of a network management system. In some embodiments, applicable test devices, such as the test device 106, may be located both centrally and/or at customer locations and may operate independently.

The communications network A 102 sends and receives the electronic signals through any number of transmission mediums. The communications network A 102 may include various fiber optics, cables, transmission towers, antennas, or other elements for transmitting voice communications to the connected communications or computing telephonic devices. In a preferred embodiment, the communications management system 104 and the communications network A 102 work to transmit packets for data traffic and voice communications through voice over Internet Protocol (VoIP) phones. However, the communications network A 102 and communications management system 104 may enable plain old telephone service (POTS), wireless service, or other forms of communications.

The CPE 119 is a device for allowing a user to communicate with the network A 102 through a communications link. The communications link may be a wired or wireless connection. For example, the connection may be Ethernet, fiber optics, cable, DSL, WiFi, WiMAX, CDMA, TDMA, GSM, GSMR, satellite, or any number of other communications connection types utilizing any number of standards and protocols. The CPE 119 may be a modem, router, switch, personal computer, server, or other device operated by the customer. One CPE 119 is shown for purposes of simplicity, but any number of customers and other users may communicate with network A 102, network B 116, and network C 120.

Network B 116 and network C 120 may also include one or more communications management systems or controlling devices, systems, or equipment. The method of the illustrative embodiments may be implemented by any of the devices and nodes within the communications environment 100. In one embodiment, each device may determine whether the network is congested or suffering failure. In another embodiment, information regarding congestion may be communicated to each device from the communications management system 104 or an equivalent device for the network A 102, network B 116, and network C 120 via internal or external operational domain protocols or management systems.

Once network A 102 is determined to be congested, degraded, running at too high of a utilization, or one or more portions of the network are in failure or suffering other throughput or capacity issues, a specified action is taken with regard to the acceptance and transmission of test packets within the network A 102. For example, test packets may be filtered or rejected at the edge ports of network 102. In the event there is an alternative route for test packets, the network A 102 may be determined to not be congested. Operational and performance thresholds may be specified for automatic detection of congestion, and triggering of specified test packet handling actions. For example, if DSLAM trunk utilization exceeds 60% the communications management system 104 may provide an alert to network operations personnel. Once the DSLAM trunk utilization exceeds 80%, test packet removal may be automatically initiated for the network A 102 or an alert suggesting activation of a test packet filtering or rejection feature may be sent to one or more users. In another embodiment, automatic test packet removal and deletion may begin in response to sensing packet discards on a protected path within the network A 102.

In one embodiment, a user in communication with the communications management system 104 may manually select to activate test packet handling actions. For example, the communications management system 104 may be part of a network operation center (NOC) or central office with any number of user terminals. A network operations manager or other user may provide user input or a command to initiate different test packet acceptance states for the network. The user input may be a verbal, textual, or data selection or command.

In another embodiment, the user may access an application, user interface, or portal stored and executed by the communications management system 104 to delete the test packets. Various actions may be taken based on the location or portion of the network experiencing congestion. In one embodiment, the testing packets are deleted. In another embodiment, the test packets are queued until the network A 102 is no longer congested. The test packets may also be rerouted or redirected to the sending device with information. The information may specify why the test cannot be completed, where the congestion is occurring, and any other information that may be useful to other networks, administrators, or users. In another embodiment, a response packet may be generated an sent to the applicable sending device or system with the information included in the header or other data portion of the response packet.

In one embodiment, one or more test packets may originate from a separate network, such as network B 116 for communication to or through the network A 102. The edge devices 108 and 110 may act to filter or otherwise remove test packets in response to a determination that network A 102 is congested. As a result, congestions situations within network A 102 are not made worse by test packets, traffic, or patterns that may further degrade the performance of network A 102. In another embodiment, the test packets may originate from within network A 102 from a device, such as test device 106.

Figure 2:
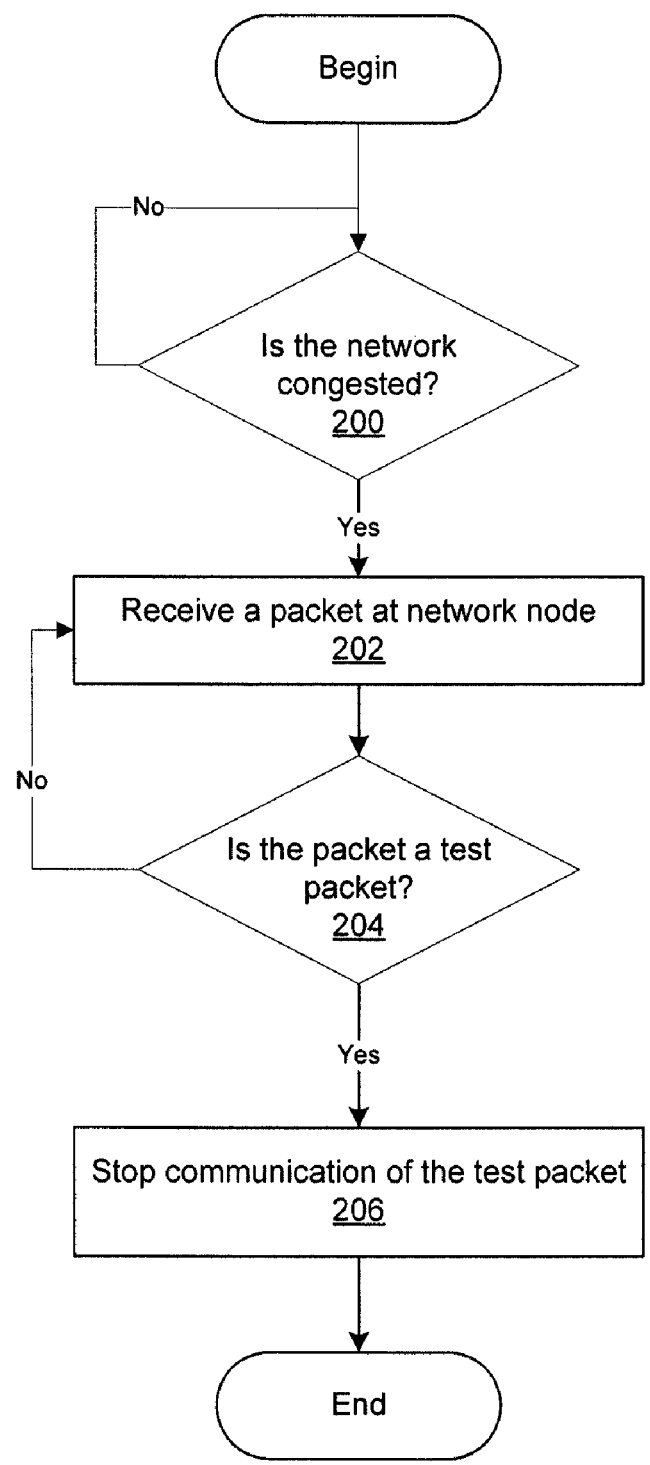
FIG. 2 is a flowchart of a process for removing test packets from a network in accordance with an illustrative embodiment.

FIG. 2 is a flowchart of a process for removing test packets from a network in accordance with an illustrative embodiment. The process of FIG. 2 may be implemented by any number of network nodes, devices, systems, networks, customers, or equipments. The process may begin by determining whether the network is congested (step 200). The network, segment, node, or device may be determined to be congested, degraded, or suffering performance issues based on information from packet counters, latency determinations, packet loss determinations, or any other suitable means. If the network is not congested, the network node repeatedly determines whether the network is congested (step 200).

If the network node determines the network is congested in step 200, the network node receives a packet at a network node (step 202). The network node may be any portion of a communications system or network. The device may be controlled by a communications service provider or customer.

Next, the network node determines whether the packet is a test packet (step 204). The determination of step 204 may be made in response to a particular flag, or other marking or indicia, within the packet itself For example, a particular field of a packet header or body may be added, modified, transformed, or appended to designate the packet as an individual test packet or as a packet within a test pattern. In one embodiment, a packet may be marked with a particular quality of service indicator associated with testing. In yet another embodiment, the packet may be addressed to a particular network address associated with testing. In yet another embodiment, the packet may be specific types of protocols with unique attributes that identify the packet as a test packet. In yet another embodiment, the packet may be sent to a particular port associated with testing. In such a manner, a packet sniffer, or other hardware or software process or component may be utilized in order to discern or distinguish packets associated with test patterns from other network traffic. Each test packet may be automatically marked when generated or upon entering the network. For example, edge devices within the network may mark test packets generated by other communications service providers or entering from other networks. In another example, test devices may utilize a standard working protocol to indicate a packet is a test packet.

If the packet is not a test packet, the network node returns again to receive a packet at the network node (step 202). In other words, the network node analyzes a subsequent packet communicated within the network, link, line, or system. In one embodiment, the network node may evaluate or analyze each packet communicated. In another embodiment, the network node may randomly test packets. In yet another embodiment, the network node may periodically test nodes at specified intervals or thresholds.

If the packet is a test packet in step 204, the network node stops communication of the test packet (step 206). In step 206, the packet may be deleted, queued, removed from a queue, not forwarded, returned to a sending device or party, stored, paused or otherwise stopped or prevented from being communicated based on network settings.

In such a manner, whether or not a packet that is part of a test pattern is communicated over a particular network segment, across a network node, or by a particular network device, depends on the state of the network. More specifically, centralized or local state engines may be utilized that indicates whether the network is suffering congestion or whether no congestion exists. A flag, trigger, update, communication, or any other suitable means may be utilized to indicate that the network is or is not congested. For example, a central network resource may periodically notify network nodes or network end-points when the network is experiencing congestion. Likewise, such functionality notification can be distributed across many nodes of the network or a determination may be made at each network node. Even in cases where an overall network is not congested, a particular network path, segment, node, or device may be indicated as being congested, such that packets that are part of a test pattern will not be communicated across or through the congested portion of the network.

Figure 3:
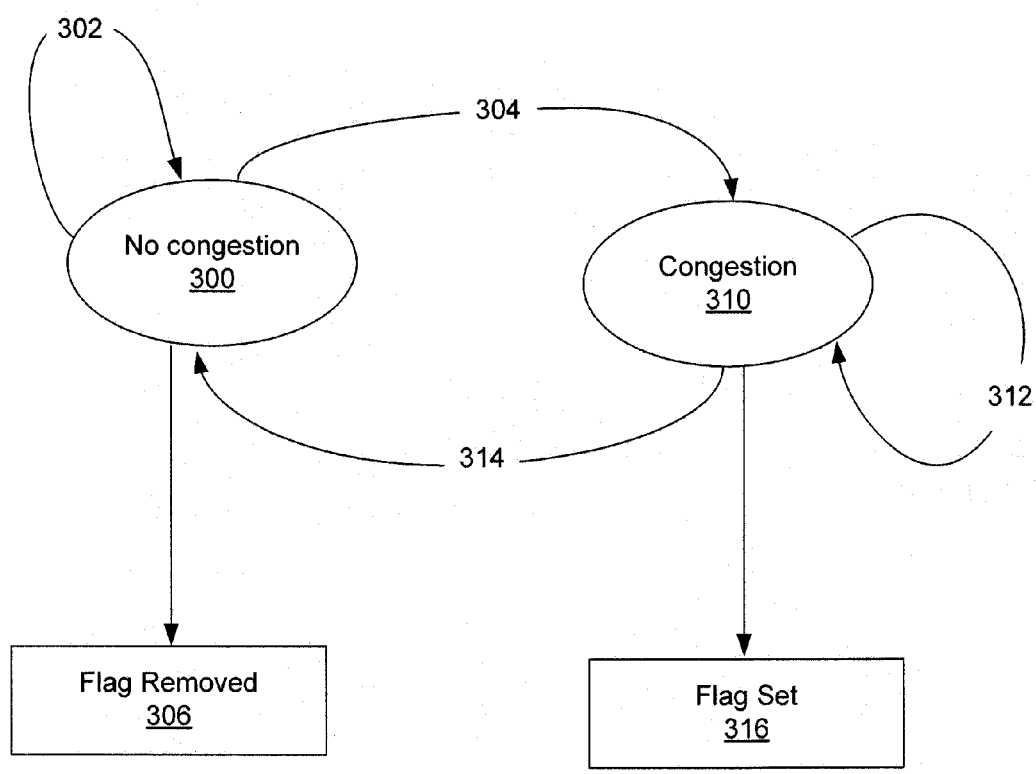
FIG. 3 is a state diagram for removing test packets in accordance with an illustrative embodiment.

FIG. 3 is a state diagram for removing test packets in accordance with an illustrative embodiment. FIG. 3 illustrates two states of a test pattern state engine that may be utilized by a customer, network or device. The states may be implemented by digital logic or stored as instructions within a memory for execution by a processor.

The processor is circuitry or logic enabled to control execution of a set of instructions. The processor may be a microprocessor, digital signal processor, central processing unit, or other device suitable for controlling an electronic device including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums. The node may include digital logic or a set of instructions that include the test pattern state engine. The node may further include other computing and telecommunications elements that typically include busses, motherboards, circuits, ports, interfaces, cards, connections, transceivers, displays, antennas, and other similar components.

In state 300, no network congestion exists. In state 310, network congestion does exist. If no congestion currently exists such that the network is in no congestion state 300, the network may periodically update such state based on new information regarding the existence of congestion. The congestion information may be determined by the node or device that transitions between states. In another embodiment, the congestion information may be received from a remote device or communications management system in communication with the network.

In step 302, the network determines that no congestion is occurring leaving the network to remain in no congestion state 300. In step 304, an indication that there is network congestion detected causes a change of state to congestion state 310. Network congestion may be determined as described herein or based on criteria, logic, and factors specified by a customer or communication service provider.

When the network is in congestion state 310, and a determination is made the network remains congested, in step 312 the network determines that congestion state 310 should be maintained. In step 314, if a determination is made that the network is no longer congested, the network determines that a change should be made to no congestion state 300.

In one embodiment, the test pattern state engine may generally cause or set an indication or identifier while in congestion state 310 such as setting a flag in flag step 316. Alternatively, if no congestion state 300 exists, a flag may be changed or removed in step 306. Although not illustrated herein, an update, notification, packet communication, or other indicia can be utilized to notify all or portions of a network that a particular congestion state exists.

The previous detailed description is of a small number of embodiments for implementing the invention and is not intended to be limiting in scope. The following claims set forth a number of the embodiments of the invention disclosed with greater particularity.

What is claimed:

1. A method of preventing a packet of a test pattern from being communicated over a network, the method comprising:
   determining a congestion state of the network from a plurality of congestion states;
   determining the packet is associated with a test pattern in response to determining the congestion state indicates the network is congested, wherein the packet is marked as being associated with the test pattern, wherein the packet is in transit; and
   terminating the communication of the packet in response to the packet being marked as associated with the test pattern and the determined congestion state indicating the network is in a congested state.

2. The method according to claim 1, wherein the network is a Metro Ethernet network, wherein the determining the packet is associated with the test pattern, marking the packet, and terminating the communication of the packet are performed by an edge device at an edge of the network.

3. The method according to claim 1, wherein the network is determined to be congested based on network utilization, wherein the packet has been communicated by a sending party to be in transit.

4. The method according to claim 3, wherein the network is determined to be congested when the network utilization is between 80-100%.

5. The method according to claim 1, further comprising;
   sending an alert to a user indicating a congestion threshold has been exceeded in response to determining the network is in the congested state; and
   setting an identifier in the network indicating the congestion state for all or portions of the network.

6. The method according to claim 5, wherein the determining a congestion state of the network is performed based on user input from a user.

7. The method according to claim 1, wherein the determining a congestion state of the network is performed remotely, and wherein the congestion state is sent from a remote location to a network node.

8. The method according to claim 1, wherein the packet is marked utilizing a flag in response to determining the network is in the congested state tracked for the network.

9. The method according to claim 1, wherein the packet is marked utilizing a header.

10. The method according to claim 1, wherein the marking is performed as the packet is communicated through the network or as the packet enters the network from another network, and wherein terminating further comprises deleting the packet.

11. The method according to claim 1, wherein the determining the packet is associated with the test pattern is enabled to be performed sequentially, randomly, or periodically based on a selection.

12. The method according to claim 1, wherein the network is congested if a network path, segment, node or device through which the packet is communicated is determined to be congested, and wherein the packet is rerouted around a congested portion of the network if rerouting is possible or deleted if rerouting is not possible.

13. The method according to claim 1, wherein the terminating is controlled by a logic selection, the logic selected operable to delete the packet, queue the packet until the congestion state indicates the network is not congested, and reroute the packet, wherein the rerouted packet indicates information about the congestion state.

14. The method according to claim 1, wherein removing and deleting the packet includes filtering or rejecting the packet.

15. The method according to claim 1, wherein terminating the communication of the packet is performed in response to a manual selection.

16. A network node comprising: a processor for executing a set of instructions; and a memory for storing the set of instructions, wherein the set of instructions are operable to: determine a congestion state of the network from a plurality of congestion states; mark a packet as being associated with a test pattern; determine the packet is associated with the test pattern in response to the congestion state indicating the network is congested; and terminate the communication of the packet as the packet is received at an edge of the network or as the packet is being communicated through the network in response to the determined congestion state indicating the network is in a congested state and the determination the packet is associated with the test pattern.

17. The network node according to claim 16, wherein the set of instructions terminate the communication of the packet by deleting the packet, and wherein the packet was received from another network.

18. The network node according to claim 16, wherein the set of instructions further:
   set an identifier in the network indicating the congestion state for all or portions of the network;
   sends an alert to a network operations user indicating the network is congested; and
   receives user input indicating the network is in a congestion state.

19. The network node according to claim 16, wherein the network node is an edge device within a Metro Ethernet network.

20. The network node according to claim 16, wherein the packet is queued until the network is determined to be in a no congestion state.

21. The network node according to claim 16, wherein the determination the packet is associated with the test pattern is enabled to be performed sequentially, randomly, and periodically based on a selection.

22. The network node according to claim 16, wherein the termination of the communication of the packet is controlled by logic of the network node, the logic operable to delete the packet, queue the packet until the congestion state indicates the network is not congested, and reroute the packet.

* * * * *